Figure 1:
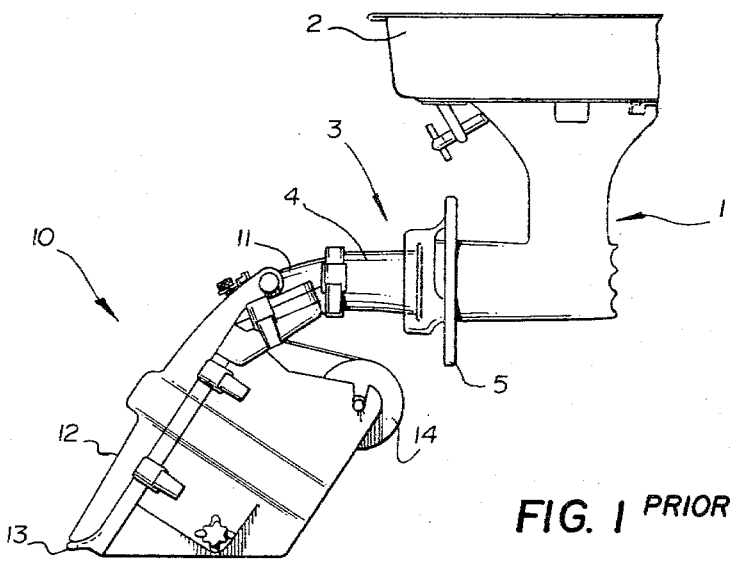

United States Patent [19]

Chinfen

[11] 4,233,018
[45] Nov. 11, 1980

[54] EGG ROLL EXTRUSION AND HANDLING APPARATUS

[76] Inventor: Dennis L. Chinfen, 58 Pellan Crescent, Kanata, Ottawa, Ontario, Canada

[21] Appl. No.: 930,060

[22] Filed: Aug. 1, 1978

Related U.S. Application Data

[63] Continuation of Ser. No. 771,459, Feb. 24, 1977, abandoned.

[30] Foreign Application Priority Data

Feb. 27, 1976 [CA] Canada .................................. 246749

[51] Int. Cl.³ .................... B29F 3/06; A21C 11/10
[52] U.S. Cl. .................... 425/297; 425/188; 425/190; 425/376 A; 425/382 R; 425/447; 425/464; 425/467
[58] Field of Search .................... 17/32; 425/183, 190, 425/382 R, 461, 464, 467, 376 R, 376 A, 376 B, 378 R, 188, 297, 447

[56] References Cited

U.S. PATENT DOCUMENTS

| 705,756 | 7/1902 | Hayes | 425/190 |
| 2,213,772 | 9/1940 | Strain | 425/376 R |
| 2,897,543 | 8/1959 | Weston et al. | 425/190 |
| 3,727,308 | 4/1973 | Ross | 425/197 |
| 4,134,335 | 1/1979 | O'Rourke et al. | 425/376 R |

FOREIGN PATENT DOCUMENTS

| 346676 | 7/1960 | Switzerland | 17/32 |
| 832710 | 4/1960 | United Kingdom | 17/32 |

*Primary Examiner*—James B. Lowe
*Attorney, Agent, or Firm*—D. Paul Weaver

[57] ABSTRACT

An extrusion device for forming and shaping food product to a chosen cross section area and shape such as the filling for Chinese egg rolls, the product requiring mild compressive action for proper binding, and wherein mild shear forces acting on the product are effective to cause separation, breakup and damage. The apparatus comprises a housing with means for forcing the food product through the housing and in which the housing contains means defining a first section receiving a flow of the food product which initially shapes the flow into a predetermined shape and cross section, followed by a stabilizing section smoothly continuously transitioning from the first section and which has an outlet whose dimensions transverse to the longitudinal direction of movement of the product do not increase. By combining the first section with the stabilizing section food product is first shaped and then gently handled so that it binds together properly. The means in the housing may comprise an insert retained in the housing by thumb screws which insert may be open on one side which contacts a wall of the housing thus allowing for easy disassembly and cleaning.

13 Claims, 15 Drawing Figures

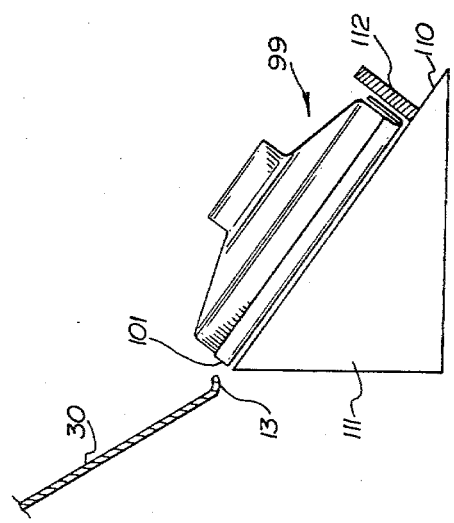
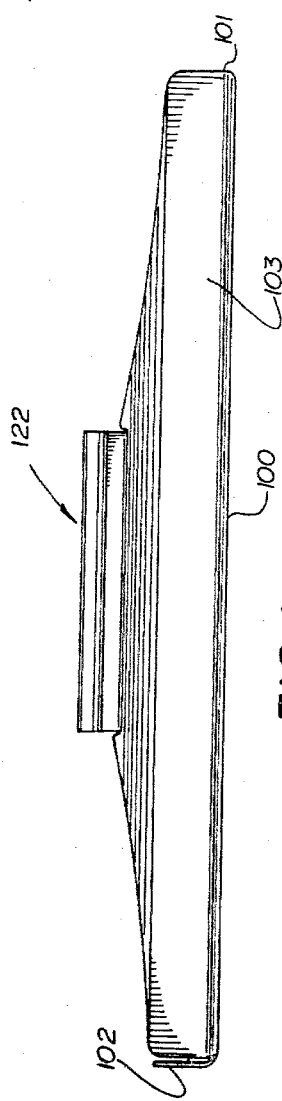
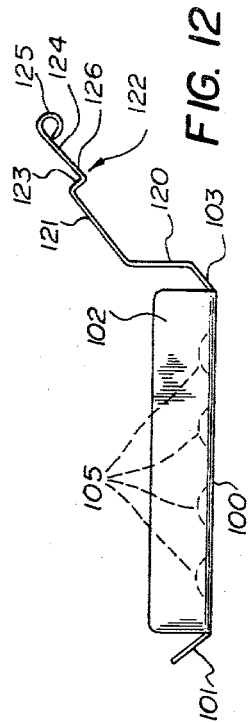
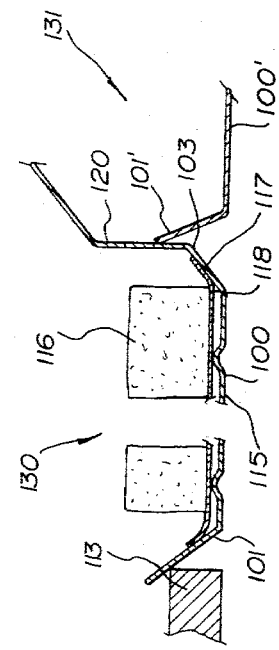
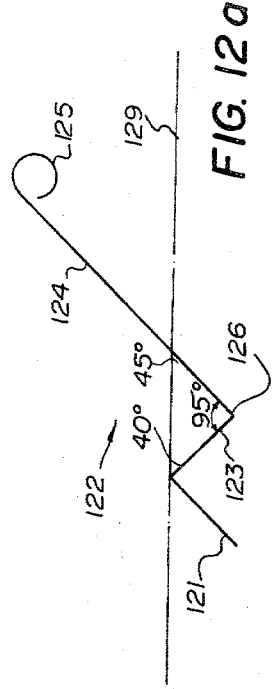

EGG ROLL EXTRUSION AND HANDLING APPARATUS

This is a continuation of application Ser. No. 771,459, filed Feb. 24, 1977, now abandoned.

This invention relates to machinery for producing chopped food patties, and particularly for the preparation of patties of soft foods which do not have great internal binding ability, and which must traditionally be handled gently in order to achieve the proper end product. Such foods include, but are not limited to, Chinese egg rolls, which are made up of quite a high proportion of chopped cabbage, bean sprouts, other vegetables and seafoods, and do not have the same inherent binding qualities found in other patties, such as those made with a relatively high proportion of ground or chopped animal meats.

A typical egg roll filling will contain approximately by weight 40–45% pork, 35–40% shredded cabbage and about 20% bean sprouts. One significant point about egg rolls, however, is that they may contain a wide variety of additional ingredients, up to approximately 25% by weight, which are available in a restaurant, as left-over ingredients from other intended dishes. Thus, for instance, other vegetables such as mushrooms, water chestnuts and seafoods, such as shrimp and lobster, and other meats, etc. may all be present, dependent upon availability of supplies and the preferences of the chef.

Traditionally, the main ingredients are prepared and mixed in raw state, and the pork is, therefore, passed through a regular meat grinder, whereas the cabbage is shredded, with salt subsequently added to help extract some of the water followed by pressing to reduce even further, the water content of the cabbage. The bean sprouts are usually placed into the filling mixture without treatment apart from washing, if necessary, and centrifugal or "fling" drying in a basket. The ground pork, cabbage and bean sprouts, with seasoning and the other optional ingredients, are then intimately mixed together and the mixture placed aside in the refrigerator.

At an appropriate time when the labor is ready to begin the molding and handling stages of the egg roll manufacture, the mixture is removed from the refrigeration, and one at a time, a skilled operator grasps, by hand and by experience, the correct quantity of filling which he then squeezes gently to ensure sufficient binding action between the ingredients, at the same time, the squeezing is controlled to produce as uniform as possible a shaped product.

After the shaping step, either immediately, or if preferred, after refrigeration on trays, when the operators are ready, the fillings are rolled by hand in thin pastry coverings. The egg roll is subsequently deep-fried, often in two stages to complete its journey to the diner's table.

Certain disadvantages follow from this traditional method of preparation. The fillings must be cold in order to be satisfactorily manipulated and shaped by hand. Hand shaping requires a considerable length of time, and therefore, unless the fillings are handled in small batches, the mixture will already have reached the warm temperature of the kitchen when the later pieces of filling are being shaped. In consequence, those egg roll fillings shaped towards the end of the run are less satisfactory in texture and in appearance, and are more difficult to stack and subsequently wrap than those made at the start of the run, since it has been found that good binding of the product requires that its temperature be cool (of the order of about 5° C.). Hand shaping of the mixture leads to a product which is not uniform in cross section, because of the shaping effect of the fingers of the operator, and even for highly experienced persons, it is still not possible, continuously, to produce a uniformly shaped product. It is found that a good operator can turn out no more than six shaped fillings per minute, and this for a poorly shaped product. A more satisfactorily shaped filling can be obtained with an output which often falls as low as four per minute.

It will also be appreciated that it is desirable that the use of the human hands to squeeze and shape a food product be avoided where possible for hygenic reasons. For even in establishments where the greatest attention to cleanliness is observed, there is danger of bacterial or mould contamination with such handling.

Attempts have been made in the past to try to cut down the labor involved in the making of egg rolls, but it is clear that the shaping process is by far the most labor intensive. One attempt to solve the problem has involved the construction of a type of slatted grill or lattice, which consists of a number of elongate openings into which, when placed on a flat surface, the mixture may be forced by hand, or with a pushing instrument, and from which the extruded fillings can subsequently be removed by lifting of the lattice or grill. This method has proved quite unsatisfactory practice, in that it is very awkward and results frequently in a poorly shaped or badly binding product. The operator thus is required to re-shape the fillings before rolling on the coverings and effectively, therefore, arrives back at the handshaping method just described.

It is an object of the present disclosure to reduce the amount of labor involved in preparing egg roll-type fillings, which are nevertheless of improved appearance, texture and consolidation, which are not subjected to intimate handling and possibly unhygenic conditions nor to the warming and consequent loss of binding of those shaped manually. The new fillings are easier to wrap in the final stage of egg roll manufacture, due to a more uniform structure. A very much higher rate of production per operator over the manual method can also be achieved.

More particularly in accordance with one aspect of the invention there is provided, in an extrusion device for forming and shaping food product requiring mild compressive action for proper binding, and including means for forcing such food product through a housing, means in the housing which comprises, means defining a first section for receiving a flow of food product forced into said housing and for initially shaping the cross section of said flow into a predetermined shape, said predetermined cross section shape being from about 0% to about 15% in excess of the area of cross section of a final desired cross section shape for said food product, and means defining a stabilizing section for receiving said food product exiting from said first section, and for reducing the area of cross section of said flow to said final desired cross section shape.

The means in the housing may comprise an insert being open on one side to a wall of said housing, said insert cooperating with said wall to form said first and stabilizing sections. The insert may include a pair of the first and second sections to produce a pair of simultaneous extrusions. The insert may include a roof, with the open side of the insert opposite to the roof. The insert may be retained longitudinally in the housing by a pair of thumb screws, and be urged into contact with the housing wall by another thumb screw. The extrusions may have one linear cross-sectional edge or may be substantially square in cross section. The predetermined cross section shape is preferably about 10% greater in area than the final desired cross section shape.

In accordance with a second aspect of the invention there is provided, in an assembly for the production of shaped food product, said product being discharged onto a severable web, and said discharged product and web being cut transversely at intervals simultaneously to provide predetermined lengths of food product arranged on said web as units, a receiving and handling tray for said units which comprises an elongated floor, a discharge side wall, an end wall and a handle side wall, ribs raised on said floor for supporting said units by means of said web, said side walls being inclined outwardly to the plane of said floor for permitting engagement of said sides by said web while sliding on said ribs, on said tray, while preventing engagement of said food product with said sides. The web may be paper. The tray may include a handle section comprising a thumb or first surface, a palm portion angularly attached to the first surface and a finger embracing portion rolling from the palm portion, with the angle between the first surface and palm portion being about 95°. The discharge edge and the handle edge may include inlet flares. A pair of the trays may be arranged on an inclined surface so that the second of the trays may push the first tray across the surface into contact with a stop for locating the second tray properly for receiving the food product units.

In accordance with a third aspect of the invention there is provided, a method of collecting and stacking a shaped food product wherein said product is discharged at a point of arrival as sequential units, each unit comprising a web and one or more pieces of the food product received on the web, which comprises, arranging an inclined support for a first tray which consists of a floor, an open edge to said floor, a discharge side wall, a handle side wall and an end wall integral with said floor, said handle side wall being connected to handle means, said support being arranged at an inclined angle to the vertical with the open side of such tray adjacent the point of arrival for receiving the units sequentially onto the floor for sliding down the floor with the first unit entering into stopping engagement with the end wall and subsequent units into stopping engagement with one another respectively, bringing a second identical tray adjacent to the first tray and forcing the first tray sideways across the support by means of the second tray, so that the open edge of the second tray takes up the position vacated by that of the first tray, lifting said first tray from the support by grasping of its handle, tipping said first tray for discharging the units from the discharge side wall, allowing said second tray to receive units from said point of arrival for loading said second tray, placing said first tray adjacent said second tray on said support, displacing the second tray by means of the first tray sideways on the support for re-orientation of the open side of the first tray adjacent the point of arrival for filling of said first tray, and subsequently lifting away said second tray by grasping of its handle edge.

Figure 2:
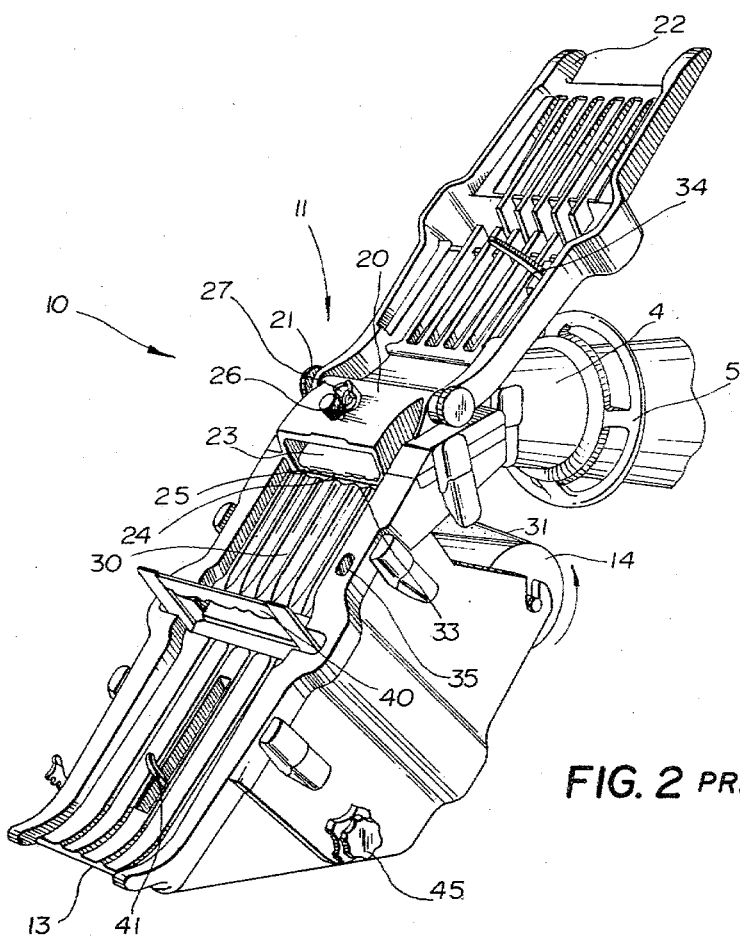
Figure 3:
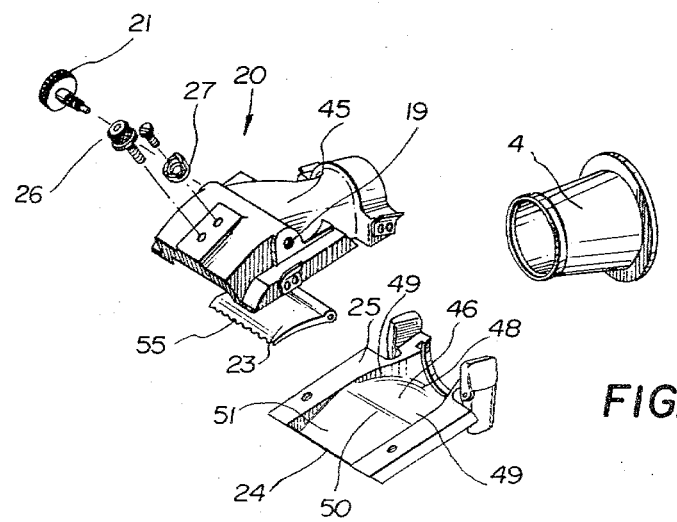
Figure 4:
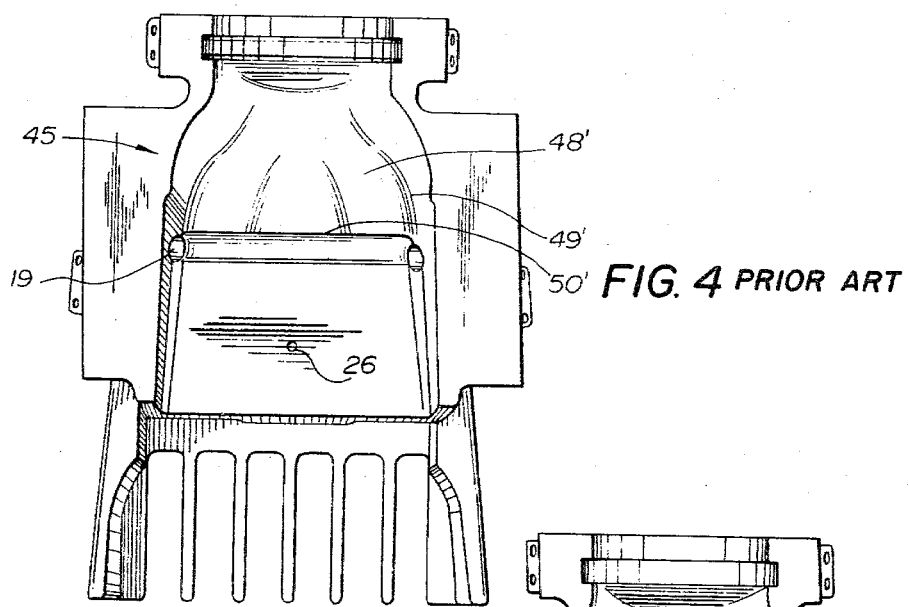
Figure 5:
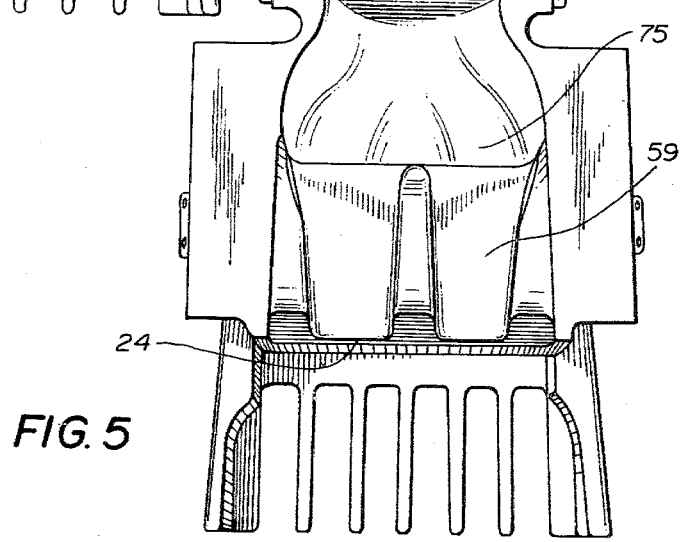
Figure 10:
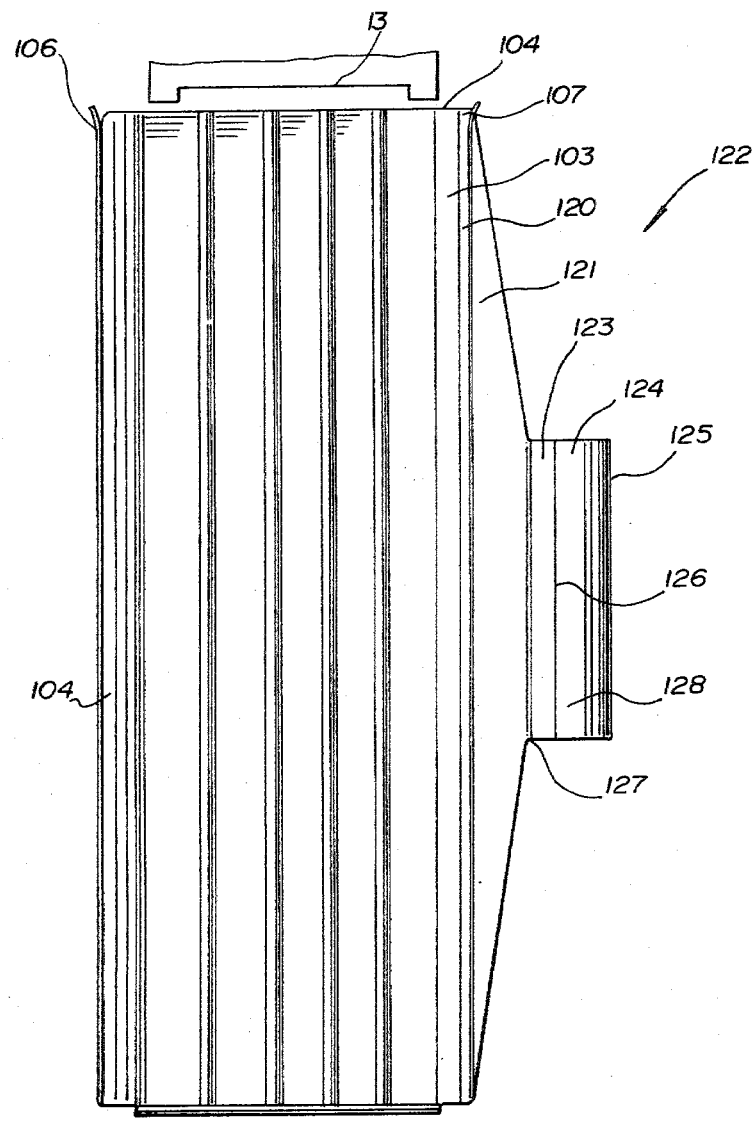

A description of specific embodiments of the invention now follows, and reference will be made to the accompanying drawings in which:

FIG. 1 shows a side view of a typical known machine for the manufacture of animal meat patties comprising a meat grinder, an extruder and a cutter, FIG. 2 is a perspective view showing the extruder and cutter in open position, FIG. 3 shows a detail exploded view of the extrusion section, particularly showing a known patty forming tongue for animal meats and the structure of the extruding section in which the tongue is received, FIGS. 4 and 5 are internal plan views of the upper part of the extruder housing without and with a novel insert respectively, FIGS. 1 to 4 represent prior art, FIGS. 6, 7, 8 and 9 show inverted plan, perspective, rear and front views successively of the insert developed by the inventor for use with the device of FIG. 3 for improved egg roll production, FIGS. 10, 11 and 12 show plan side and end views respectively of a novel tray for collecting egg rolls produced by the apparatus in plan view, FIG. 12a is a detailed view of part of FIG. 12, FIG. 13 shows a side view of a novel tray supported on an inclined surface with part of the apparatus of FIGS. 1 and 2 in operation, and FIG. 14 shows an end sectional view of a pair of trays of FIGS. 10 to 13.

With reference to FIG. 1, the apparatus consists of a grinder 1, fed from a food hopper 2, and having an output section 3 which includes a worm for moving the food forwards, to a cutter plate and assembly (not shown). These are essentially quite conventional, however, a modification is made to the worm cutter in a manner described below. To the output of the section 3 is coupled a discharge nozzle 4 retained in position by screw hand wheel 5. Coupled to the nozzle 4 is a patty-handling apparatus 10, consisting of an extrusion section 11 with chute and cutting section 12. Patties cut to determined length are discharged at 13 on a paper backing fed from a roll 14.

Further details of the assembly 10 and extrusion section 11 are seen in FIG. 2. The extrusion section consists of a housing 20 on which is mounted by thumb screws 21, (received in holes 19, FIG. 3) a cover member 22. Also attached to these thumb screws within the housing 20 is a forming tongue 23, which can pivot on extensions of the thumb screws, so as to enlarge or narrow the slot 24 defined between the bottom of the housing 25 and the tongue through which meat product passing through the nozzle 4 can be discharged from the extrusion section. The size of the slot 24 is determined by the setting of a second thumb screw 26 which acts against a rotatable stop 27. Material discharged from the extrusion section passes on to a paper web 31 received on the chute 30, which is fluted for ease of flow of the material. The paper web 31 arrives from roll 14 having passed up through a slot 33 between the edge of the housing 20 and the chute 30. Extruded material from the slot 24 slides down the chute 30 on the paper, passes under a knife 40, and engages a trigger member 41 rising from below the lower part of the chute. The trigger member actuates the knife 40 to cut the material and the paper web at appropriate intervals determined by the position of the trigger, which can be set by means of knob assembly 45. The cut patties then slide freely down the chute and are discharged at the edge 13. This assembly as described, is quite conventional. In general, the knife 40 is solenoid actuated and the knife is shaped in such a way that the material on the paper and the paper web are split rather than sheared, and the knife does not require sharpening during its lifetime. To protect the fingers of the operator from getting under the knife, the cover 22 must first be swung down over the chute 30 in use and the knife cannot be operated until the cover 22 is properly clamped in position. This interlock is provided by stem 34 which enters hole 35 and engages a limited movement switch (not shown) for the solenoid.

Reference to FIG. 3 shows in more detail, the structure of the conventional housing 20 consisting of the bottom part 25 and the upper part 45. The bottom part 25 includes a flow channel 46, which leads from the nozzle 4 to the discharge area 24. The channel is so-shaped that it leads the material from the nozzle, from a circular cross section to a rectangular cross section, in an action which first allows outward spreading of the material to the sides, while contracting in a vertical direction, and then downward delivery in rectangular cross section to meet the chute 30 and the paper web 31 (see FIG. 2). The upper portion 45 of the extrusion section, (FIG. 4) complementarily allows outward movement of the stream of material exiting from nozzle 4, while squeezing it in a vertical direction to form the required rectangular cross section. To allow for uniformity of cross section of the material, both in the bottom channel 46 and in the top member 45, the passages are shaped so that the thickness of the stream is brought to the required dimension in the central area 48 and 48' before the peripheral areas 49 and 49'. In the upper member, the material first reaches the tongue 23 at the region 50' just opposite that represented by the line 50 on the lower member 25, flowing past this point. The tongue 23 (not shown in FIG. 4) is contacted by screw 26 so as to adjustably restrict the thickness dimension of the stream of material, so that the conventional animal meat product passing through the extrusion orifice is force through a passage with a ceiling formed by the tongue up to the point where it exits at 24. While passing through this passage, the corrugations 55 in the tongue 23 produce a lined upper surface to the product.

Figure 6:
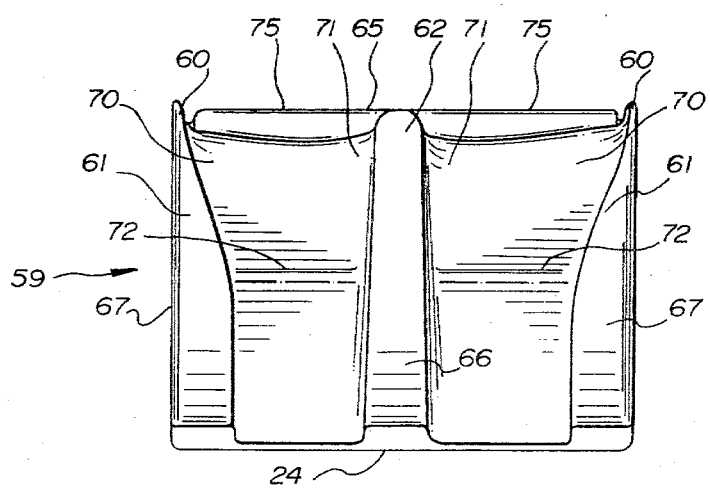
Figure 7:
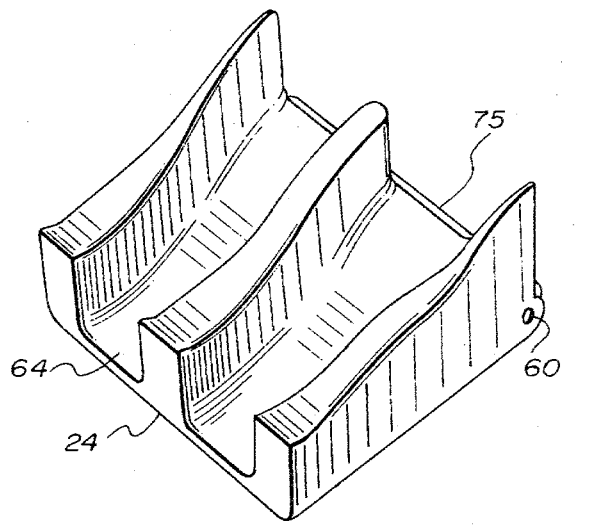

In practising the present invention, the conventional apparatus, just described, is modified by the removal of the tongue 23 from the top member 45 and the introduction of an insert depicted in FIGS. 5, 6, 7, 8 and 9. As can be seen in FIG. 7, this insert includes locating holes 60 for entry of projections on the thumb screws 21 received in holes 19 (see also FIGS. 2 and 4) and is of such thickness that the feet 61 and 62 rest on, and conform to, the forepart 51 of the channel 46 (FIG. 3). The upper surface 64 (FIGS. 7 and 9) is continuous from the region of the thumb screw holes 60 to the discharge edge 24 (FIGS. 2 and 3), and is clamped by means of the thumb screw 26 so that the surfaces 61 and 62 (FIG. 9) firmly engage area 51 (FIG. 3). It is this insert 59 which allows the proper shaping and forming of egg roll mixture into continuous rectangular, but almost square cross-sectional extrusions which have a good bonding, without being subjected to excessive or insufficient pressure. The upper part of insert 59 at its end 65 where the mixture enters, closely matches the shape of top member 45 at this point, in turn to allow smooth flow of the mixture. The insert 59 also includes legs 66 and 67.

Figure 8:
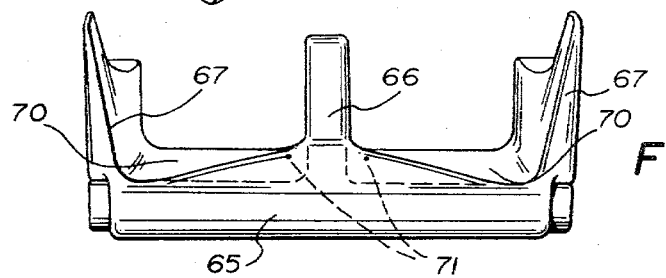
Figure 9:
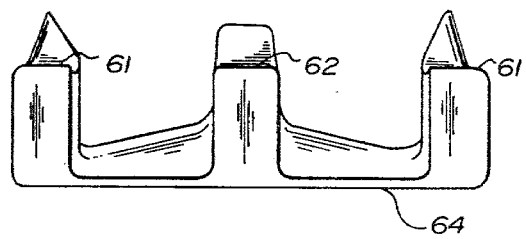

The leg 66 divides the material flowing out of the entry extrusion section into two flows. The leg 66 thickens sideways as the flow moves forward, thereupon constraining the material in a sideways direction to reduce this dimension. The exterior legs 67 also serve to act upon the flow of material to reduce its sideways dimension, and they too thicken laterally in the flow direction towards the exit area 24. This structure is best seen in FIG. 6. The upper surface 64 of the insert 59, is shaped firstly to conform essentially parallely to the shape of area 51, but allowing a slight increase in thickness of the cross section of material as it flows through the area 71 though not in area 70. The areas 70 and 71 are shown in FIGS. 6 and 8, (in FIG. 8, the area 71 being shown in broken lines, since it is behind the leading edge 65 of the insert). The intent in the areas 70 and 71 is to shape the cross section by slightly reducing the height in the area 70, while allowing it to increase very slightly in the area 71. Subsequently, on its passage through the extruding section, the vertical dimension of the material is reduced very slightly on passage from a point about halfway through the insert at line 72 (FIG. 6) to the exit area 24. Over this section, the lateral dimension of the material being extruded also reduces, but only in the same proportion as the thickness dimension. The very considerable decrease in lateral dimension from the entry area 75 to the half-way point 72 (the first section) is well illustrated in FIG. 6. In general terms, therefore, this insert shapes the material as it passes through by reducing its lateral cross section by some 30 to 40% (typically from 1.7 inches to 1.1 inches) and (typically in the prototype) reduces its vertical dimension from approximately 0.94 inches to approximately 0.81 inches at the outer edges while increasing the dimension from 0.62 inches to 0.81 inches in the central regions. However, the dimensions at section 72 are all reduced in passing from the section 72 to the outlet 24 by approximately 5% so as to produce a gentle final squeezing and shaping action on the egg roll filling. This is the stabilizing section of the insert, and is about 1 inch long in the prototype. The action, therefore, of this insert when used in conjunction with the extrusion housing 20, is to shape the material from essentially a long rectangular cross section at entry 75 to two almost square sections in two stages. The first stage produces the overall shaping, but also compressing action (to a predetermined cross section shape), the stabilizing section (after 72) gives a mild final stabilizing shaping (to the final desired cross section) with a 5% dimensional reduction compression, that is about a 10% cross-sectional area reduction. A range of area reduction of 0% to about 15% is found to be satisfactory.

The action of the stabilizing section is important. If the mixture is brought directly down to final size and then ejected into the environment, there is a tendency for the product to disintegrate. This behaviour is particularly caused by the somewhat elongated strands of material (the bean sprouts and cabbage) which appear to require a period in the extrusion process during which they can align properly and take up their final position in the extruded product, while the smaller particles consolidate around them. By having a symmetrical cross section to the stabilizing section (transverse to the direction of flow of the material) an even rate of flow of material is achieved. Any uneven flow of material tends to cause a bunching on the side of greatest flow and/or skewing toward the side of lesser flow. This is particularly pronounced where more than one extrusion channel with different flow rates are present. Thus, where more than one extrusion channel is present, care should be taken to ensure that not only the cross-sections of the individual channels are symmetrical, but that their cross-sections are similarly dimensioned as illustrated in FIGS. 6, 7, 8 and 9. This not only precludes "bunching" and/or skewing, but also avoids separation of the material being extruded from the channel having the lesser flow rate. These effects are achieved by the stabilizing sections of the insert.

The overall dimensional reduction principally in the first stage also ensures that the filling will be packed together before leaving the extruder and must be pushed out of it by the following material. This avoids any tendency of material to fall out of the extruder, as may occur if decrease in cross-sectional area is not effected at this point.

The square cross-sectional shape of the extruded product is considered preferable because it is important that the product adhere to and be stable on the paper web 31 when it leaves housing 20. This requires a flat underside to the extrusion. Since the shaped extrusions require subsequent wrapping to complete the egg roll preparation, the essentially square cross section is the most practical.

While the insert 59 here illustrated forms two adjacent extrusions, it may in some instances be desirable to use an insert which will produce one extrusion or more than two, dependent upon the size of egg roll filling required and the size of the housing 20 into which the insert is to be fitted. In some cases too, it may be desirable to form the insert so that the extrusion channels are closed on all four sides rather than using one face of the housing to close off the channels in the insert. The use of the open-sided insert, however, enables better cleaning of the insert and also full use of the height of the housing 20 for the vertical dimension of the extrusion cross section.

It is found that for optimum binding of the extruded material, its temperature should be in the range of about 2.0° C. to 4.5° C. (36° F. to 40° F.). Higher temperatures cause softening of the finished extrusions as was mentioned earlier for the traditional hand-shaped product. If binding of the extrusions were not adequate, there could be a tendency for the material above the cutting knife 40 to separate from that being extruded and to drag the paper web 31 with it. One advantage of the new apparatus described here, however, is that the filling material can be handled in a very short time compared with the manual method, the food material can, therefore, be processed at optimum temperature, while cool from the refrigerator with no problem of separation of the shaped filling material arising. The alignment of the elongated pieces of the food material in the stabilizing section also improves the binding of the material by their consolidation within the remaining material.

A second modification made to the conventional apparatus of FIGS. 1, 2 and 3 concerns the cutter blade in the worm section of the grinder. It is not desirable that egg roll filling mixture placed in the hopper 2 be further subdivided and all that is required is that the worm deliver the material to the extrusion housing 20. Preferably, therefore, a cutter plate (necessary for support merely of the discharge end of the worm) is chosen with the largest available holes (¾″ or over). All the blades are then cut off the cutter (there are typically four on a conventional cutter) except one. This remaining blade is retained to ensure that material (particularly bean sprouts) may not hang up on and finally block the holed plate.

Also available for some machines are cutter plates with three large kidney-shaped holes (resulting in three webs for supporting the worm), the long dimension of such holes being of the order of one to one and a half inches. Such plates are even more suitable. The cutter blade may in general be dispensed with if runs of fillings of 2 to 4,000 only are being made, however, if desired, it may be retained without detriment.

For handling the egg roll fillings produced by this apparatus, is a novel tray 99 arranged to receive the double egg roll extrusions, which have first been received on the paper web 31 and sheared into the required lengths, typically 2½ inches, by the knife 40 These "units" consisting of pairs of egg roll fillings on paper, (hereafter also called "the patties") thus slide off the lip 13 of the chute 30 and onto the tray, of which details are shown in FIGS. 10, 11 and 12. This tray 99 consists essentially of a floor bottom or receiving portion 100, which is defined on three sides by discharge edge 101, rear edge 102 and handle edge 103. The tray is open at the leading end 104, where it receives the patties from the lip 13 of the chute 30 (see FIG. 13). The tray 99 is arranged on the surface 110 of a suitable structure 111, the surface 110 being inclined typically at about 40° to the vertical and the chute at some 65° to 70° to the vertical. A rail 112 is fastened to the surface 110 to provide a back-stop for the tray 99, and a stop rail 113 running up the surface 110 is also provided (see FIG. 14), in order to locate the tray laterally, with respect to the chute 30 in a manner to be described later. The patties sliding down the chute 30, after being cut, pass the end 104 and are free to continue to slide down the tray by virtue of raised ribs 105 in the floor 100. The height of these ribs is not critical, nor is their number in the floor 100, however, they should not be too low that small or particles of food could lodge in the areas between the ribs and interfere with the movement of the patties down the ribs, nor should they be so high, that the product is raised up from the floor 100 to any extent. Typically, in a tray whose floor is 3.5 inches wide, a rib height of 0.1 inch from the floor 100 is quite sufficient. Guiding of the units or patties onto the tray is assisted by the flared edges 106 and 107 on the sides 101 and 103 of the tray. Should any patty leave the chute at a slight angle, the flares prevent any catching of the paper and lead to smoother, uninterrupted flow. The first of the patties is stopped by the rear edge 102, and subsequent patties come to rest in order as they contact the respective patty further down the tray. A typical tray will accommodate five such patties. The angles at which the sides 101 and 103 are arranged, are important, in that if sides 101 and 103 are made too vertical, with respect to floor 100, the patty material may contact against the side walls leading to twisting, and pile-up and disorder of the materials on the tray. It is important for good performance, that each of the patties should be cleanly discharged from the chute 30 and be lined-up with the others uniformly on the tray. With reference to FIG. 14 and side 103, the paper 115 on which patty material 116 is sitting, bends up at its edge 117, and a corner 118 of the patty material bears against the lower part of side 103 through the intermediary of the paper which prevents the material actually contacting any part of side 103 directly. If 103 were vertical, any very slight overturning movement would cause the upper edge of the patty material to hit the side with consequent untidy results. The ribs on the floor 100 are self-cleaning, so that the paper continues to ride properly on the ribs, whereas any traces of patty material are swept over the edges of the ribs, and do not interfere with the motion of the patty arriving subsequently. The rear wall 102 leans away from the vertical very slightly, so that only the lower parts of the patty contact this wall. Typically, 3,000 patties can be handled with this tray, without sticking or interference in their movement on the tray, whereas if no ribs are present, as few as three or four fillings and discharges of the tray results in sticking, and a requirement that the tray be cleaned before proceeding. Edge 101 fulfills exactly the same function as edge 103, when the patties are being loaded onto the tray, but is also necessary as a discharge edge, from which the patties are subsequently unloaded. This will be described later.

The handle edge 103 continues to an essentially vertical portion 120. and a side sweeping portion 121, which leads into the actual handle or grasping portion 122. This consists of a thumb edge 123, a palm edge 124, and a rounded edge 125.

When patties are to be discharged from the tray, the handle portion 122 is grasped so that the thumb lies along the first surface 123, the ball of the hand rests against area 128 of palm surface 124, the rounded finger edge 125 is embraced by the fingers, with the tips of the fingers on the underside of surface 123 overlapping the fold line 127 between the surface 123 and the sweeping portion 121. An alternative grasping method involves placing the thumb over the top of fold line 127 so that the tip of the thumb lies on the upper surface of 121. Either of these methods of holding allows a comfortable grasping action on the tray, particularly when the tray is mounted at an incline as shown in FIG. 13. For best effect, the angles between surfaces 121 and 123, and 123 and 124, are significant, in that, 124 should be approximately 45° to the plane of bottom 100, whereas surface 123 should make about 40° with the plane of the bottom. The angle between surfaces 123 and 124 should thus be about 95°. This is illustrated in FIG. 12a in which line 129 is parallel to tray floor 100.

When a tray is full, it is first displaced from its position beneath the chute 30. This is done by bringing up an empty tray, and pushing the full tray 130 sideways across surface 110 by means of the empty tray 131, so that the two make up the position shown in FIG. 14, with edge 101 of tray 130 resting against stop rail 113 and edge 101' of tray 131 against vertical wall section 120 of tray 130. This properly locates tray 131 below the chute leaving the full tray 130 off to the lefthand side, as seen in the Figure. The tray 130 is then grasped at the handle, lifted and transported to a larger tray or stacking surface. The tray next tipped sideways, so that the patties come to rest against the edge 101. Further tipping of the tray causes the patties to slide over the edge onto the large tray or surface, where the patties are to be placed. It is a simple matter to stack sets of patties in a neat and orderly fashion on one another, using this method.

The particular arrangement of the parts of the handle ensures that the tray can be rotated about its longitudinal axis (by twisting of the wrist) for dumping and stacking the patties and can be rotated about its transverse ax (for tilting the tray in a pitching motion) when arranging it at the proper angle on surface 110 and when lifting it from this surface. Rotation about the axis perpendicular to the plane of bottom 100 also occurs as a result of the movement from the surface 110 to the dumping situation.

Changeover of trays, is, therefore, quickly effected, lifting away the first tray, after first sliding the next one into loading position.

I claim:

1. In an extrusion device for forming and shaping food product to a chosen cross section area and shape, the product requiring mild compressive action for proper binding, and wherein mild shear forces acting on said product are effective to cause separation, breakup and damage to said product affecting said proper binding, said device include a housing and means for forcing such food product through said housing, means in said housing which comprises,
   means defining a first section having an inlet receiving a flow of food product forced into said housing by said forcing means and having an exit region of a first predetermined cross section area and shape, said first section means initially shaping the cross section of said flow to conform to said first predetermined cross section area and shape,
   and means defining a stabilizing section having an inlet smoothly continuously transitioning from the exit region of said first section and having an outlet of second cross section area and shape corresponding to said chosen cross section area and shape for said food product,
   said inlet of said stabilizing section having a cross section corresponding to said first cross section area and shape, whereby said food product exits said first section and smoothly enters said stabilizing section, said first cross section area being up to about 15% greater than said second cross section area at said outlet, and said stabilizing section comprising a defined longitudinal passage whose dimensions transverse to the longitudinal direction of said passage do not increase from said inlet of said stabilizing section to said outlet,
   whereby said first section delivers said product to said stabilizing section as a continuous even flow and alters the cross section of flow of said food product from said first predetermined cross section area and shape to said chosen cross section area and shape as said product passes through said stabilizing section to said outlet and proper binding of said product is effected.

2. Apparatus as defined in claim 1, comprising a side-by-side pair of said first sections and a side-by-side pair of said stabilizing sections forming a pair of extrusions of food product of said chosen cross section shape.

3. Apparatus as defined in claim 1, said stabilizing section being of length of about 1 inch.

4. An apparatus as defined in claim 1, said means for forcing food product through said housing comprising a holed plate through which said product is forced, and a blade rotatable with respect to and cooperating with said plate for clearing pieces of food product caught by said plate.

5. An apparatus as defined in claim 1, said means for forcing food product through said housing comprising a holed plate through which said product is forced, said plate having holes therein of at least ¾ inch diameter, and a blade rotatable with respect to and cooperating with said plate for clearing pieces of food product caught by said plate.

6. Apparatus as defined in claim 1 said first predetermind area of cross section of said first section at its said exit being about 20% to 50% less than the area of cross section of said first section at its said inlet.

7. Apparatus as defined in claim 1, said first predetermined area being about 10% in excess of said second cross section area at said outlet of said stabilizing section.

8. Apparatus as defined in claim 1, the first section and the stabilizing section being of substantially equal length.

9. Apparatus as defined in claim 1, said means in said housing comprising, an insert one side of which being received adjacent and cooperating with a wall of said housing, each of said sections being defined by respective cavities formed in said insert and a corresponding part of said cooperating wall.

10. Apparatus as defined in claim 9, said insert including a second side opposite to said one side, said housing including at least a pair of thumb screws for engaging and retaining said insert in said housing, and a vertically oriented thumb screw for contacting the second side of said insert and urging and retaining said insert in cooperating contact with said housing wall.

11. Apparatus as defined in claim 9, the final desired cross section shape including a linear edge.

12. Apparatus a defined in claim 11, the final desired cross section shape being substantially square.

13. Apparatus as defined in claim 11, the predetermined cross section shape also being substantially square.

* * * * *